United States Patent [19]

McCoy

[11] 4,216,854
[45] Aug. 12, 1980

[54] FEEDING APPARATUS WITH ENGAGED/DISENGAGED TRANSPORT MECHANISM

[75] Inventor: John W. McCoy, West Milford, N.J.

[73] Assignee: Avon Products, Inc., New York, N.Y.

[21] Appl. No.: 924,224

[22] Filed: Jul. 13, 1978

[51] Int. Cl.² .................. B65G 29/00; B62C 7/02; F16D 67/02
[52] U.S. Cl. .................. 198/481; 198/723; 198/857; 188/69; 192/12 R; 192/17 R; 198/491
[58] Field of Search .......... 198/469, 470, 480, 481, 198/491, 531, 572, 575, 576, 723, 857; 192/12 R, 33 R, 17 R, 17 A; 188/69, 82.4

[56] References Cited

U.S. PATENT DOCUMENTS

| | | | |
|---|---|---|---|
| 2,619,217 | 11/1952 | Merrill | 198/575 |
| 3,017,963 | 1/1962 | Landschulze | 188/82.4 |
| 3,599,781 | 8/1971 | Hoadley | 198/723 |
| 3,850,289 | 11/1974 | Behr et al. | 198/857 |

*Primary Examiner*—Joseph E. Valenza
*Attorney, Agent, or Firm*—Pennie & Edmonds

[57] ABSTRACT

A transport mechanism for articles between a pair of conveyors includes a constantly driven drive member, a driven member and a ball and detent mechanism intercooperating between a pair of confronting surfaces of the members. The transport mechanism is mechanically phased in and out in operation in timed relation to movement of the conveyor to which articles are moved. Mechanical phasing in and out is carried out by a lever having a tooth adapted for engagement in a notch of the driven member and a wheel cooperative with a rail including a gate on the drive member. The transport mechanism is phased out of operation when the wheel enters the gate and phased in in operation when the wheel exits the gate.

12 Claims, 6 Drawing Figures

FEEDING APPARATUS WITH ENGAGED/DISENGAGED TRANSPORT MECHANISM

BACKGROUND OF THE INVENTION

The present invention is directed to a feeding apparatus having a transport mechanism for use in a conveyor line wherein articles of manufacture are "picked up" at a first conveyor and relocated to a second conveyor. The invention, particularly, is directed to the manner of transmission of a drive to a driven member and to structure for engaging and disengaging the driven member thereby to terminate the transport operation when a quantity of articles on the first conveyor is insufficient for continuous operation.

In an overall process both of fabricating and handling an article of manufacture, it oftentimes is necessary to relocate the article from one conveyor onto a second conveyor at a spacing which is different from the spacing of the articles on the first conveyor. Thus, the transport mechanism which transports and in transport relocates the articles for receipt on the second conveyor necessarily should operate in a timed sequence particularly if the articles are to be received in individual fixtures carried by the second conveyor. Also, it oftentimes is required or preferable that the articles be relocated from the first to the second conveyor continuously such that each fixture on the second conveyor receives an article; and, if articles cannot be relocated continuously, such as, for example, when an insufficient number of articles are located on the first conveyor, there should be a shut-down of the transport mechanism.

It has been suggested that the transport mechanism be independently driven and that the drive means be activated and deactivated upon command of a detector or the equivalent which senses an insufficient number of articles on the first conveyor as will be required for the operation to continue without interruption. However, this type of operation has the disadvantage that the drive to the transport mechanism is required to be timed with the drive to the second conveyor and unless the transport mechanism and the second conveyor are driven by a common drive means, it is difficult to maintain any degree of synchronization between the two moving structures. Further, it is considered to be preferable that drive to the second conveyor be continuous thereby to obviate the necessity to include sophisticated braking mechanisms and overcome possible conditions of lost motion between the drive and the driven components of the second conveyor.

SUMMARY OF THE INVENTION

The present invention is an improvement over apparatus of the prior art in the handling of articles of manufacture; and by means of a new and improved transport mechanism and structure for its positive, mechanical phasing in and out the drive both to the second conveyor and to the transport mechanism may derive from a common drive means whereby a driven member may be engaged with an input drive to commence the transport of articles and disengaged from the input drive to discontinue the transport of articles from the first to the second conveyor.

The transport mechanism of the present invention includes a drive member fixedly supported on a rotatable shaft, a driven member supported by the shaft for independent rotation, a ball and detent mechanism carried by one of the drive and driven members intercooperating at confronting surfaces of the members for transmission of driving torque between members and means carried by the driven member for supporting articles being conveyed.

In a preferred form of the invention, the drive member carries a pullywheel which supports a belt by which it is continuously driven. The belt is also supported by a pullywheel at the output shaft, for example of a prime mover. The drive member includes at least one and preferably two or more depressions in the surface in confronting disposition to that of the driven member. The depressions are radially spaced from the axis of the shaft upon which the drive member is supported. The driven member includes at least one and preferably two or more bores, each providing a guide for a spring-loaded ball capable of engaging in and disengaging from a respective depression in the drive member. The driven member carries an article supporting structure such as a starwheel or pair of spaced apart starwheels including a number of integral pockets and, additionally is formed with a notch into which a tooth of a lever may be received. Thus, the radial force imparted on the driven member by the lever overcomes the axial force developed between the drive and driven members by the ball and detent mechanism to discontinue or disengage the drive to the driven member. At the same time, the drive both to the drive member and to the second conveyor continues.

The structure for the mechanical phasing in and out of the driven member, in addition to the lever, includes a rail supported by the drive member having both an inner and outer concentric surface and at least one gate entering into a race. The lever includes a wheel adapted to be moved into contact with the rail thereby to follow either of the concentric surfaces prior to entry into the race through the gate or to exit from the race through the gate as the driven member of the transport mechanism is mechanically phased in and out. Particularly, when the transport mechanism is to be phased in, after having been phased out, the wheel will ride on the inner concentric surface of the rail and when the gate arrives at the location of the wheel, the wheel rapidly will exit through the gate. Thereafter, the ball and detent mechanism substantially simultaneously will align to transmit driving torque from the drive to the driven member. The amount of torque to be transmitted is dependent, among other factors, upon the forces of compression acting on each spring-loaded ball, the depth of each depression in the driving member into which a ball is received as well as the outline of the depression.

The novel features which are considered as characteristic of the invention are set forth in particular in the claims appended hereto. The transport mechanism and the structure for its mechanical phasing in and out in operation, however, both as to its construction and mode of operation together with various features which improve upon the prior art and the advantages of its operation will be best understood through the consideration of the following detailed description of a preferred embodiment with reference to the accompanying drawings.

DESCRIPTION OF THE PREFERRED EMBODIMENT

The transport mechanism 10 of the present invention has particular application in the transport of articles of manufacture in a production line and includes a drive and driven member, a clutch heretofore described as a ball and detent mechanism for transmitting a driving torque and means carried by the driven member for supporting the articles being relocated. It is a particular aspect of the invention to phase in and out the drive member, that is, to mechanically couple and decouple the driven member in a timed relation to the movement of a conveyor to which the articles are relocated as the drive member continues to rotate. This operation is provided by a lever which cooperates with both the drive and driven member in a manner to be described.

Typically the production line may be formed by a plurality of conveyors, such as a conveyor 12 and a conveyor 14 (see FIGS. 1-4) which are located in positions requiring the transport of the articles from one conveyor to the other. In such transport, it also is typical that the articles undergo some degree of manipulation, such as a reorientation in attitude or a spacing in relative position, to name two possibilities.

In the present invention, the articles which may be lipsticks 16 residing on conveyor 12 in side-by-side disposition are transported to conveyor 14 on which the individual lipsticks are deposited in a uniform, space disposition. The latter conveyor supports a plurality of fixtures 18, each in the form of an elongated rectangular block having a notch 20 of V-shaped outline along the major dimension for support of the lipstick in movement to a downstream station (not shown) in the production line. The term "downstream" as the term "upstream", refers to the direction of flow of lipsticks.

The conveyor 12 may comprise a belt (not shown) entrained about a sprocket 22 carried on a shaft 24. Lipsticks 16 which move downstream along conveyor 12 to a supporting surface 26 at the end of the conveyor preferably are confined during movement between a top plate 28 and a pair of side plates (not shown) thereby to be in proper disposition for transport to conveyor 14. Conveyor 12 may be constantly driven with the intention that the operation will maintain a quantity of lipsticks 16 backed up from the region of the supporting surface so that the transport of lipsticks from conveyor 12 to conveyor 14 will be continuous. The conveyor 14, likewise, is driven continuously to deliver lipsticks to the downstream work station which may comprise a labeling station, for example. Both the conveyor 12 and the conveyor 14 may be driven by any means which is conventional in the conveyor arts.

Figure 5:
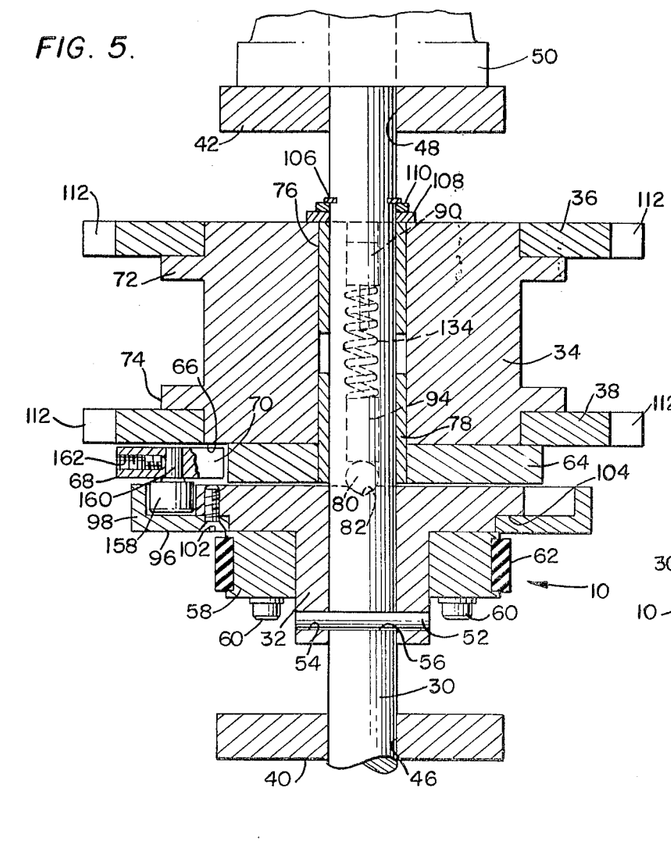
FIG. 5 is a view in section as seen along the line 5—5 in FIG. 3.
Figure 6:
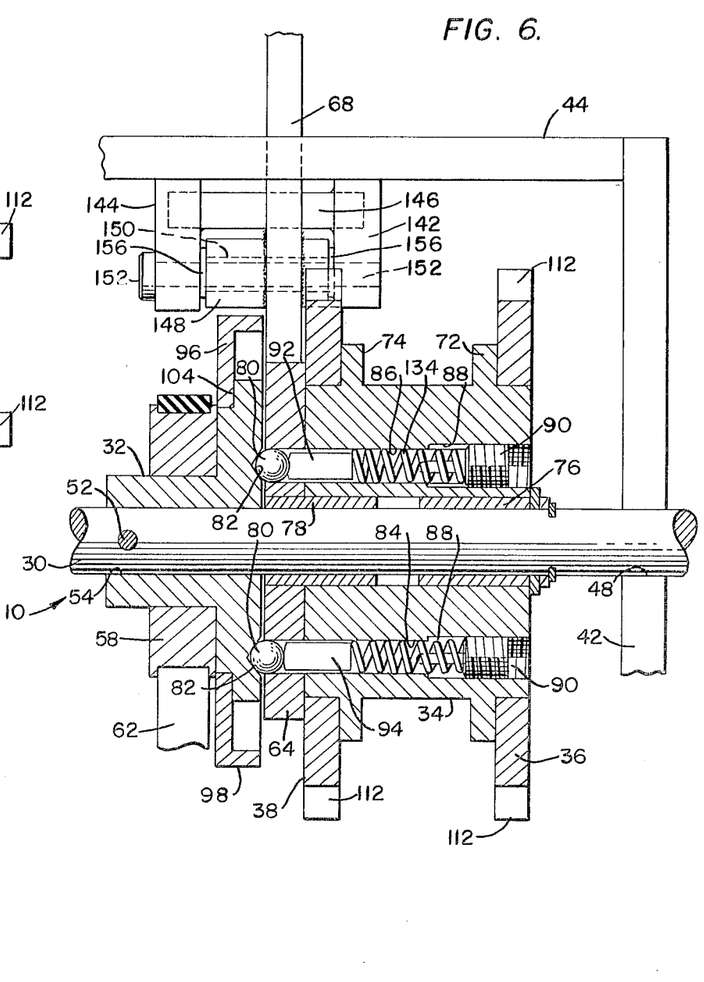
FIG. 6 is a view in section as seen along the line 6—6 in FIG. 3.

The transport mechanism, perhaps seen to best advantage in FIGS. 5 and 6, includes a shaft 30, a drive member 32, a driven member 34 and a pair of starwheels 36, 38. And, the transport mechanism is located between and supported by a pair of plates 40, 42 which extend upwardly in parallel, spaced relation from a portion of a frame or table (not shown) which may support the conveyors 12, 15. The plates 40, 42 are connected to the frame or table at their lower ends and joined at the top by a plate 44. Any means may be used for purposes of securement, such as a plurality of bolts (not shown). In the assembled relation the plate 44 extends in an upstream direction to provide a support for structure to be described. The plates may be formed of aluminum or any other well known material capable of providing structural stability in a mechanized environment. In the support of the transport mechanism, the opposite ends of shaft 30 are received through a bore 46 in plate 40 and a bore 48 in plate 42, respectively, and into a journal box 50 (only one being shown) suitably mounted on the plates, for example, by means of a plurality of bolts 51.

The drive member 32 is mounted fast with shaft 30 for conjoint rotational movement. To this end, the drive member may be mounted on the shaft by means of a pin 52 received through one or a pair of bores 54 in the drive member and a bore 56 in the shaft in coaxial alignment. A keyway or the equivalent may also be used.

The drive member includes a hub portion 32a and a disc portion 32b from which the hub portion extends. The hub portion includes an outer surface concentric with the axis of shaft 30 and the disc portion includes a planar surface perpendicular to the axis of the shaft. The bore or bores 54 pass through the hub portion. A pullywheel 58 is mounted on the hub portion. The pullywheel is fixedly secured to the disc portion opposite to the planar surface by a plurality of bolts 60 or the equivalent. To this end, the bolts are received through the pullywheel and threaded into the disc portion of the drive member. An endless belt 62 is entrained about the pullywheel and located by a pair of annular flanges. A driving input to the shaft is provided by a drive means (not shown) through the drive of the belt.

An important aspect of the present invention relates to the positive, timed, mechanical phasing in and out, that is, both the starting and stopping of the driven member 34 and starwheels 36, 38 relative to rotation of the drive member 32 as the drive member continues to rotate. As will be described, the mechanical phasing in and out of the driven member is carried out by a lever 68 movable between a first position of non-cooperation and a second position of cooperation with the driven member to develop a radial force on the driven member which overcomes the axial force developed by a ball and detent mechanism of the clutch for transmitting a driving torque to the driven member. Actually, in the preferred embodiment, a disc 64 is fixed to the driven member for conjoint rotation. The disc has a planar surface located in close juxtaposition to the planar surface of drive member 32. The spacing may be about 0.03 inch. The disc also includes at least one notch 66 in its peripheral surface. The lever is movable about a pivot and in movement to its second position a tooth 70 carried at one end enters into the notch.

In the present operation, a continuous feed of lipsticks 16 from conveyor 12 to conveyor 14 will be carried out so long as a sufficient quantity of lipsticks is located along the conveyor 12. If an insufficient quantity of lipsticks is located along conveyor 12 as determined by a signal from a low level reference detector in the form of a switch or photoelectric device or the equivalent (not shown), a control will respond to phase out or stop the driven member. A high level reference detector (also not shown), of similar make-up, will respond to signal the control to phase in or start the driven member timed to the movement of conveyor 14 when the quantity of lipsticks located along conveyor 12 is increased sufficiently.

Figure 3:
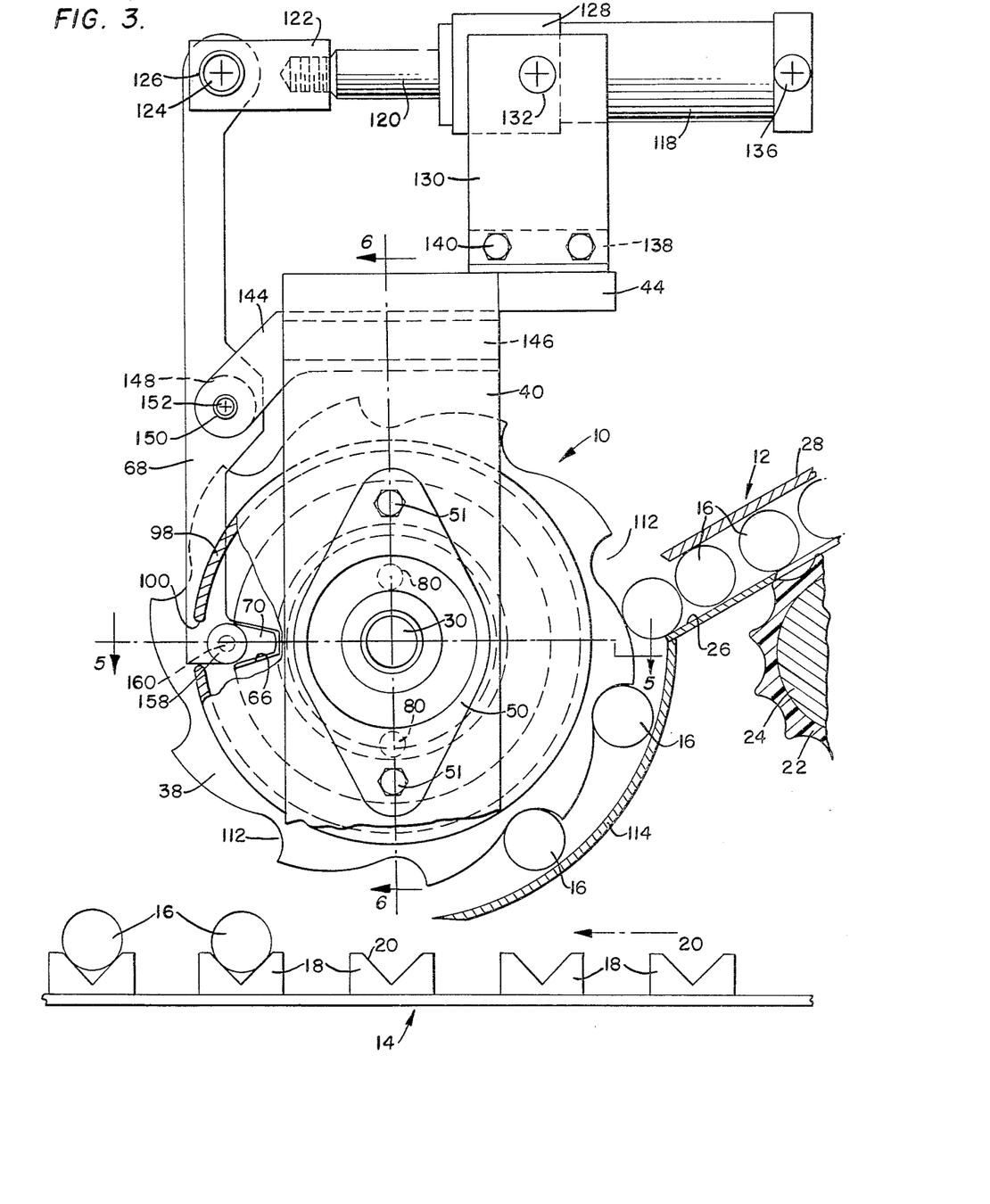

The notch 66 may be of any particular outline such as the outline illustrated in FIG. 3. To this end, the notch includes a pair of sides inclined toward a base at an angle of about 15° relative to a radius of disc 64 and symmetrical about that radius.

The surfaces at the entrance to the notch preferably will be somewhat rounded to permit ease in entry of the tooth of complementary configuration.

The driven member 34 exclusive of disc 64 comprises a body of spool-like outline having a pair of flanges 72, 74 in the region of its ends which extend radially. The starwheels are received on the body, the starwheel 36 being received adjacent the outer surface of flange 72 and the starwheel 38 being received adjacent the outer surface of flange 74. Both the starwheels 36 and 38 may be secured to the body by means of a plurality of screws (now shown) received through a flange and threaded into a starwheel. The disc 64 is received on the body in a like manner. The disc is of a diameter greater than that of the body thereby to assist in the securement of starwheel 36. The structure described herein as "driven member" will be considered to include both the disc and body.

The driven member 34 is mounted for rotation about the shaft 30 by means of a pair of bearings 76, 78 which may be press-fit or otherwise received within the central bore. The bearings may be P. F. Boston solid bronze bearings. During normal operation, the driven member is driven through the clutch and the driving torque of drive member 32. During normal operation, the quantity of lipsticks along conveyor 12 will prevent operation of the low level detector. If the quantity of lipsticks should be reduced so that the low level detector provides a signal, the driven member is arrested in movement yet the drive member 32 continues to rotate under control of the drive input through belt 62.

The ball and detent mechanism includes at least one ball 80 but preferably two or more balls carried by the driven member 34 and a like number of detents or depressions 82 formed on the planar surface of drive member 32. Each depression may be conical in outline with sharp edges and of a depth to partially receive the ball. These factors together with the amount of spring loading on each ball are significant as to the magnitude of the torque that may be transmitted.

In the preferred embodiment of the present invention, the connection between the drive member 32 and the driven member 34 is provided by a pair of balls 80 located along a diameter either at the same or at different radii from the axis of shaft 30. This particular location of the balls relative to the axis of shaft 30 is permissable if the starwheels 36, 38 have an even number of pockets for receipt of lipsticks 16; whereas, if the starwheels have an odd number of pockets, the disposition of the balls would be at different radial spacing to assure that the driven member is in the proper angular position when it is phased in or started. Further, the number of balls may be increased two-fold, maintaining, however, their disposition relative to the axis of shaft 30 as required by the number of pockets in the starwheels. If the number of balls is increased by a two-fold amount, the disposition of the balls, further, will be in a plane perpendicular to the plane of the former balls.

As perhaps best seen in FIG. 6, the driven member 34 is provided with a pair of bores 84, 86, one end of which is counterbored, as at 88. The bores 88 are threaded throughout at least a portion of their length and a screw 90 is received within each bore. Each screw including a pin portion projecting from one end supports a spring 91, whose other end acts upon one of a pair of followers 92, 94. Each follower acts upon a ball 80 and the force on each ball may be adjusted by adjustment of screw 90 and, consequently, the compression of each spring. The followers may be formed of drill rod material.

The clutch further includes structure on the drive member in the form of a plate 96 of annular form. The plate carries a rail 98 at its periphery. The plate and rail may be one piece or individual elements fastened together in any manner as may be convenient. The rail includes a gate 100 (see, for example, FIG. 1) whose corners preferably are rounded off to eliminate any sharp edges. The plate 96 is attached to the disc portion of drive member 32 by means of a plurality of screws 102 received through the plate and threaded into the drive member. While not shown in the figures, the plate 96 may be received on the drive member in any one of a plurality of positions thereby to locate the gate 100 relative to the drive member. In the present embodiment, the plate may be located in one of four equally spaced positions. An arcuate bore at each position which extends through about 30° permits precise adjustment of the plate relative to the drive member. The sides of the bore may be chamferred so that the screws 102 do not extend beyond the plane of plate (see FIG. 5). As also seen in FIG. 5, the plate is received within an annular cutout 104 formed in the drive member. Preferably, the depth of the cutout will be equal to the thickness of the plate so that the pulleywheel 58 may reside closely adjacent the disc portion of drive member 32. Another gate spaced from the first by an angle of 180° may be provided to permit more rapid phasing in and out of the driven member.

The transport mechanism is secured in the position between plates 40, 42 by means of a fastener 106 which may be a TRUARC fastener acting between shaft 30 and driven member 34. A washer 108 and a bearing 110 such as a thrust bearing may be received between the fastener and the drive member for spacing and to permit freedom of rotation. The washer may be formed of solid bronze.

Turning now to the illustration in each of FIGS. 1–4, having the aforementioned discussion of the several component parts of the transport mechanism in mind, the operation of the apparatus can now be fully described.

Figure 1:
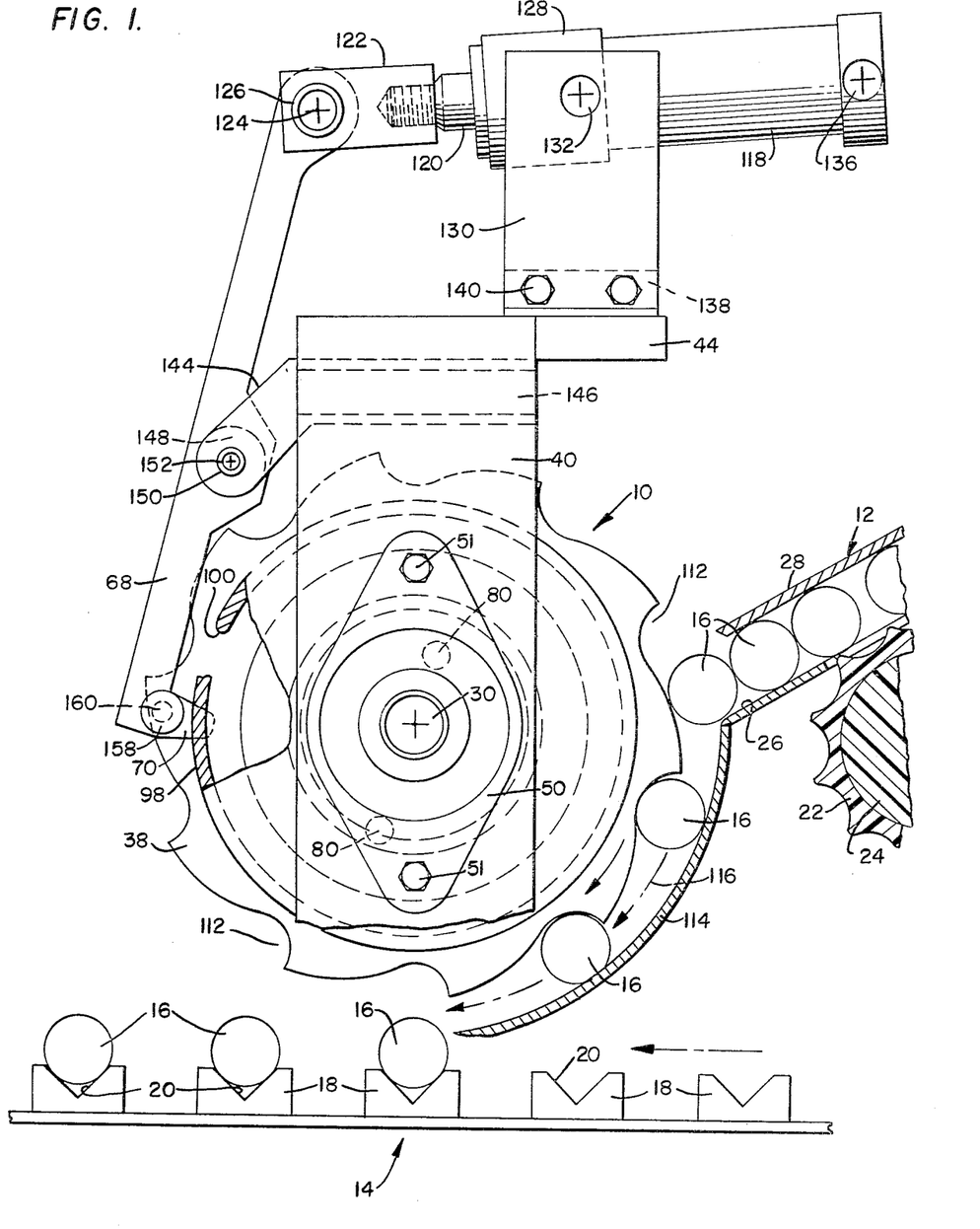
FIG. 1 is a view in elevation, partly in section, of the transport mechanism of the present invention adapted for feeding articles of manufacture from one conveyor to another conveyor in timed relation.

FIG. 1 represents the position of structure during the continuous operation of the transport mechanism 10 for transport of lipsticks 16 from conveyor 12 to conveyor 14. As described, the lipsticks are deposited on conveyor 14 in fixtures 18 at a longitudinal spacing substantially equal to the angular spacing of a plurality of pockets 112 formed in each of the starwheels 36,38. In the continuous operation, each individual lipstick 16 is "picked up" from a disposition at the end of surface 26 at the downstream end of conveyor 12 and is supported within the pocket above a rail 114 extending from the end of surface 26 to a region immediately above the conveyor 14. Both the surface 26 and rail 114 have a width substantially equal to the length of a lipstick 16 and the rail 114 is concentric about the axis of shaft 30 thereby to guide the lipstick in movement in the direction of arrow 116.

The lever 68 is defined by an elongated crank. The crank is mounted at one end by an actuating mechanism 118 and pivoted generally within the region of its midlength. The actuating mechanism may comprise an hydraulic or pneumatic cylinder or a solenoid or the equivalent. In the preferred embodiment, the actuating mechanism is a pneumatic cylinder including a rod 120 movable in opposite longitudinal directions in response to the operation of the high and low level detectors. To this end, the rod may extend, that is, more longitudinally to the left in FIG. 1 in response to a signal from the low level detector to pivot the level counterclockwise from the first to the second position, and more longitudinally in the opposite direction upon retraction to pivot the lever clockwise in response to a signal from the high level detector. A clevis 122 is threaded on a threaded extension of the rod and the lever 68 is supported on a stub-shaft 122 extending through the confronting, spaced apart sides of the clevis. The stub-shaft may be positionally supported by any structure as convenient in the art, such as a fastener (not shown, but which may be of the type of fastener 106). A bearing 126 supported by the clevis receives the stub-shaft thereby to enhance movement of the lever around the axis of stub-shaft 124 in following movement of rod 120. The bearing may be of the type of bearings 76,78.

The actuating mechanism supports a collar 128 at its forward end and, in turn, is supported between a pair of plates (only plate 130 being seen) by means of a pair of diametrically opposed pins (only pin 132 being seen). A bearing (not shown) may be received into the bore in each plate to receive a pin and enhance pivotal movement of the actuating mechanism as required during operation. One pressure fitting 136 for introducing an actuating fluid into the cylinder for actuation of the lever 68 may be seen in the figures. As may also be seen in the figures, the plate 130, and its associated plate, is supported on a plate 138 mounted on plate 44. To this end, plate 130, and its associated plate, may include a cutout in the lower, inner surface so that a shoulder rests upon plate 138. The several plates may be welded or secured to one another by means of a plurality of bolts 140. And, the plates 130 (and its associate plate 138) may be formed of stainless steel.

Referring now to FIG. 6, a pair of arms 142, 144 which also may be formed of stainless steel, are secured to the underside of plate 44 in any convenient manner and supported in spaced apart relation by a member 146 extending therebetween. The member 146, likewise, may be supported by the arms 142, 144 in any convenient manner such as within a pair of facing channels. The lever 68 is enlarged within the region midway between the ends and is provided with a bore for purposes of mounting the lever to the arms 142, 144. A collar 148 substantially equal in length to the spacing between arms is received through the bore in the lever and a bearing 150 is press-fit in the collar. The collar may be welded to the lever. The pivotal mounting is completed by a stub-shaft 152 having a reduced threaded portion at one end for receipt in a tapped bore formed in arm 142. An enlarged head is formed at the other end of the stub-shaft to be tightened against the surface of arm 144. A pair of washers 154, 156 are disposed between the collar 148 and the arms 142, 144 to enhance the movement capability of the lever arm about its pivot axis. The bearing 150, likewise, may be of the type as bearings 76, 78.

Returning now to the illustration in FIGS. 1–4, during continuous operation of the transport mechanism 10, the lever will be pivoted about shaft 152 in the clockwise direction to a first position. In this orientation of the lever, a roller 158 carried by the lever will be disposed outwardly of the outer concentric surface of rail 98. The roller, as may be seen in FIG. 5, is supported by an axle 160 which extends into a bore in lever 68. The roller may be formed of solid bronze. A set screw 162 may be used to secure the axle in the mounted disposition.

Figure 2:
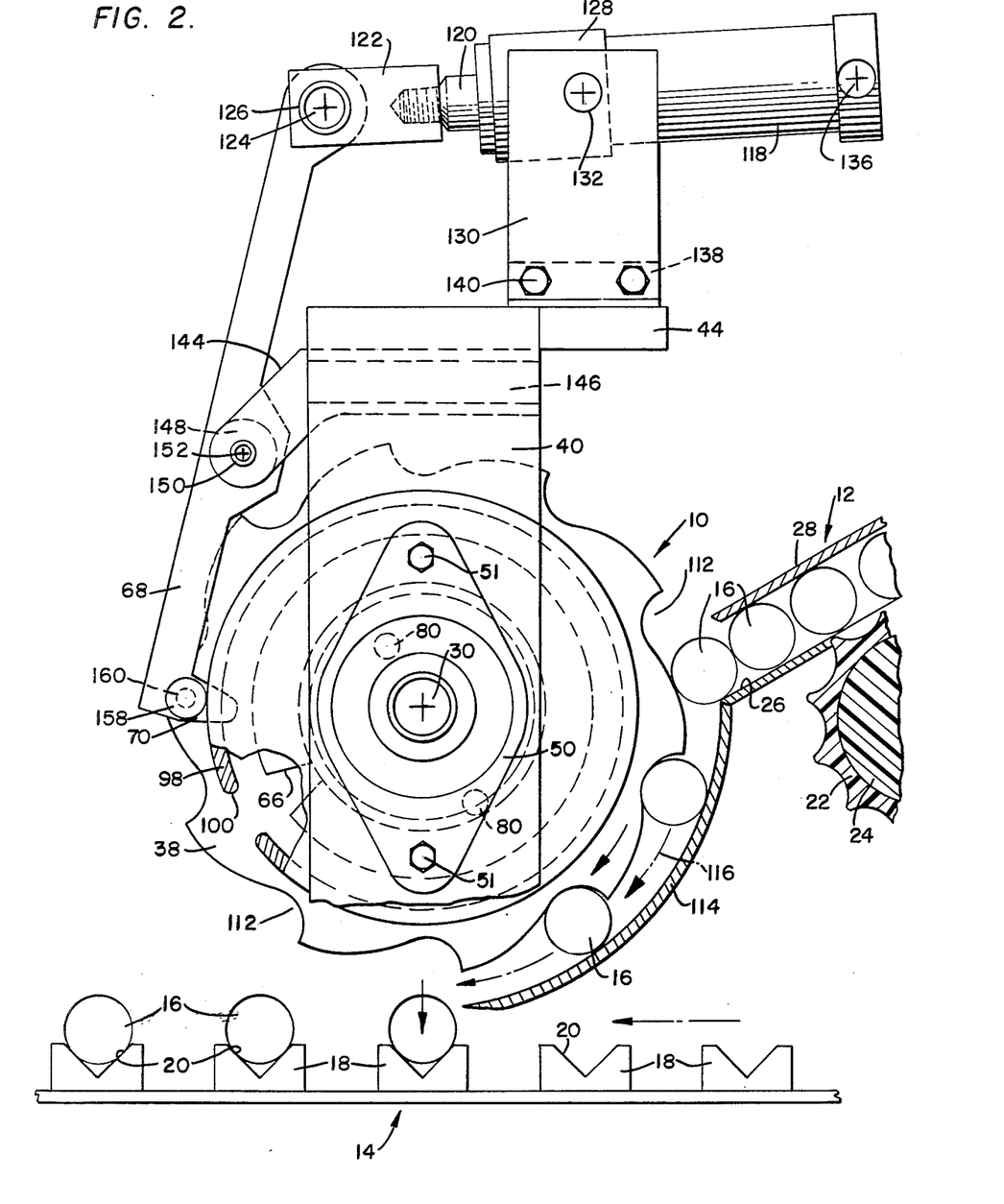
FIGS. 2, 3 and 4 are views similar to FIG. 1 and which together with FIG. 1 illustrate the mechanical phasing in and out of a driven member of the transport mechanism relative to its drive member, which is driven continuously.

In FIG. 2, the structure for engaging the disengaging the transport mechanism is illustrated in a disposition at which the roller is rolling on the outer concentric surface of the rail 98 in response to actuation of the actuating mechanism and in response to a signal from the low level detector. The roller, therefore, will be in a position to enter the gate 100 as the drive member 32 rotates in the clockwise direction. As indicated in the figure, the notch 66 is in alignment with the gate so that as the roller enters through the gate, the tooth 70 will engage in the notch. As previously indicated, the notch is located in disc 64 of driven member 34 and, upon engagement of the tooth, the driven member is arrested. The drive member 32 continues in movement, driven by the pulleywheel 58. This latter operation is illustrated in FIG. 3. Thus, during the period that there is an insufficient number of lipsticks 16 on conveyor 12, the drive and driven members are disconnected and the roller is disposed within the race between the inner surface of the rail 98 and the outer surface of the disc portion of the drive member.

Figure 4:
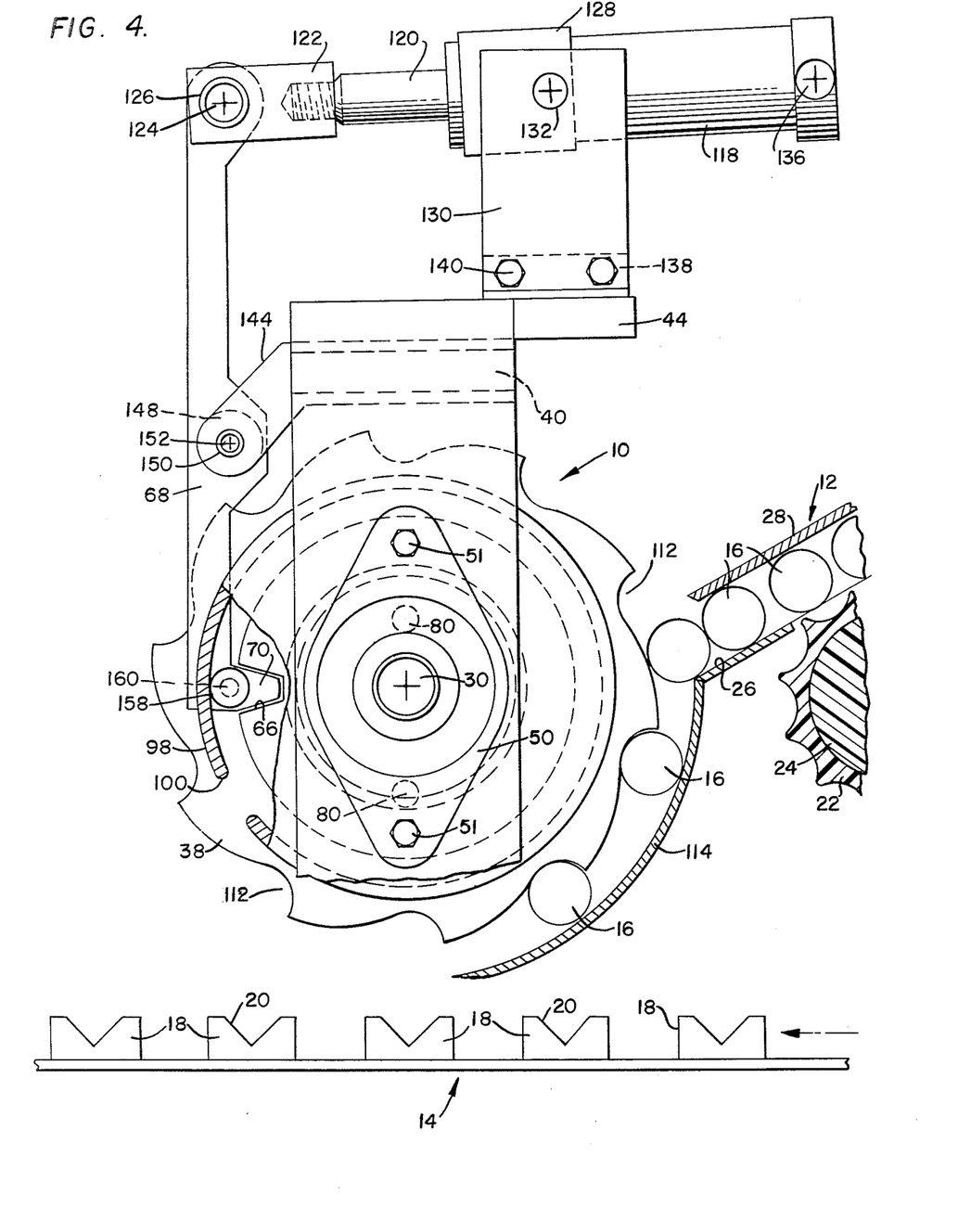

FIG. 4 illustrates the position of the components of the transport mechanism when a further quantity of lipsticks 16 are received on conveyor 12 thereby to comprise a sufficient number of lipsticks for continuous operation. In this connection, a signal will have been received from the high level detector to reactuate the actuating mechanism whereby the tooth 70 partially withdraws from notch 66 and the roller rides on the inner concentric surface of rail 98. As in FIG. 2, which illustrates the roller riding on the outer concentric surface of the rail in a position to enter the gate 100 as the drive member 32 rotates clockwise, in FIG. 4 the roller is riding on the inner concentric surface of the rail in a position to exit through the gate 100 as drive member 32 moves in further rotation in the clockwise direction. Thus, the tooth will ultimately completely disengage from the notch as the roller exits the gate and the lever will return to the first position at which it is located in FIG. 1. The transport mechanism again will function continuously in the movement of lipsticks 16 from conveyor 12 to conveyor 14.

The structure of the transport mechanism 10 generally may be formed from cold rolled steel; whereas, the disc 64, lever 68, and both the plate 96 and rail 98 may be formed of material 4140 which is suitably hardened to withstand the operations described.

While the invention has been described in connection with preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. A transport mechanism adapted for use in a conveyor line for transporting articles seriatim and in continuous flow from an upstream conveyor to a downstream conveyor comprising
   (a) a drive member,
   (b) means for driving said drive member continuously,
   (c) a driven member,
   (d) transport means carried by said driven member for moving the articles over a laterally adjacent article supporting means,
   (e) a shaft for supporting both said drive and driven members for rotation,
   (f) clutch means acting between said drive and driven members for transmitting torque to said driven member, said clutch means normally engaging said drive and driven members,
   (g) an annular rail supported on said drive member and defining a circular race therebetween,
   (h) a gate formed in said rail, communicating with said race,
   (i) a notch carried by said driven member, and
   (j) means cooperating with both said drive and driven members to engage said clutch, said cooperating means including
      (1) a lever having means adapted for riding on said rail and for entering into said notch when said riding means passes through said gate
   whereby said drive member continues to rotate and said driven member is arrested in movement.

2. The mechanism of claim 1 wherein said drive and driven members have cooperating faces and said clutch means includes
   (a) at least one ball,
   (b) a bore equal in number to the number of balls in one of said drive and driven members, each said ball received in a bore,
   (c) resilient means for moving each said ball toward a face, and
   (d) detent means on the other of said members, said detent means comprising a depression into which an individual ball under action of said resilient means is partially received.

3. The mechanism of claim 2 wherein said clutch means includes a pair of balls, and each ball supported in a bore in said driven member.

4. The mechanism of claim 3 wherein the axes of said bores are located at equal radii.

5. The mechanism of claim 1 wherein said transport means includes
   (a) at least one starwheel including a plurality of pockets, each pocket adapted to receive an article in movement.

6. The mechanism of claim 5 wherein said transport mechanism includes
   (a) a pair of starwheels, each starwheel including a like number of pockets, said starwheels being supported for movement conjointly with said driven member, and said pockets of each starwheel disposed in axial alignment 7. The mechanism of claim 1 wherein said riding means includes a roller and said entering means includes a tooth.

8. The mechanism of claim 1 wherein said lever has a tooth at one end, and further including means mounting said lever for pivotal movement between a first position and a second position at which said tooth enters into said notch for disengaging said clutch, and means for acutating said lever in movement between said positions.

9. The mechanism of claim 8 wherein said lever carries a roller at said one end adapted to ride on said rail when said lever moves toward said second position preparatory to said tooth entering into said notch when said roller passes through said gate to complete movement to said second position.

10. In combination:
    (a) a drive member;
    (b) a means for driving said drive member continuously;
    (c) a driven member;
    (d) a shaft for supporting both said drive and driven member for rotation;
    (e) clutch means acting between said drive and driven members for transmitting torque to said driven member, said clutch means normally engaging said drive and driven members;
    (f) an annular rail supported on said drive member and defining a circular race therebetween;
    (g) a gate formed in said rail, communicating with said race;
    (h) a notch carried by said driven member, and
    (i) means cooperating substantially simultaneously with both said drive and driven members to disengage said clutch, said cooperating means including
       (1) lever having means adapted for riding on said rail and for entering into said notch when said riding means passes through said gate
    whereby said drive member continues to rotate and said driven member is arrested in movement.

11. A conveyor apparatus including a first conveyor for conveying articles to a pick-up location, a second conveyor for receiving articles seriatim, and a transport mechanism for transporting articles from said first to said second conveyor, said transport mechanism comprising
    (a) a drive member,
    (b) means for driving said drive member continuously,
    (c) a driven member,
    (d) a transport means carried by said driven member for moving the articles over a laterally adjacent article supporting means,
    (e) a shaft for supporting both said drive and driven member for rotation,
    (f) clutch means acting between said drive and driven members for transmitting torque to said driven member, said clutch means normally engaging said drive and driven members,
    (g) an annular rail supported on said drive member and defining a circular race therebetween,
    (h) a gate formed in said rail, communicating with said race,
    (i) a notch carried by said driven member, and
    (j) means cooperating with both said drive and driven members in response to a low level of articles on said first conveyor to disengage said clutch, said cooperating means including
       (1) a lever having means adapted for riding on said rail and for entering into said notch when said riding means passes through said gate
    whereby said drive member continues to rotate and said driven member is arrested in movement to discontinue transport of said articles to said second conveyor.

12. The conveyor apparatus of claim 11 wherein said means for driving said drive member also drives said second conveyor.

* * * * *